(12) United States Patent
Takeuchi et al.

(10) Patent No.: US 11,370,183 B2
(45) Date of Patent: Jun. 28, 2022

(54) COMPOSITE MATERIAL MANUFACTURING METHOD AND COMPOSITE MATERIAL

(71) Applicant: MITSUBISHI HEAVY INDUSTRIES, LTD., Tokyo (JP)

(72) Inventors: Yukio Takeuchi, Tokyo (JP);
Katsunori Akiyama, Tokyo (JP);
Shunichi Morishima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 166 days.

(21) Appl. No.: 16/629,810

(22) PCT Filed: Apr. 25, 2019

(86) PCT No.: PCT/JP2019/017623
§ 371 (c)(1),
(2) Date: Jan. 9, 2020

(87) PCT Pub. No.: WO2019/220914
PCT Pub. Date: Nov. 21, 2019

(65) Prior Publication Data
US 2021/0008818 A1    Jan. 14, 2021

(30) Foreign Application Priority Data

May 18, 2018   (JP) .............................. JP2018-096233

(51) Int. Cl.
*B29C 70/44*   (2006.01)
*B29C 70/08*   (2006.01)
(Continued)

(52) U.S. Cl.
CPC .......... *B29C 70/443* (2013.01); *B29C 70/081* (2013.01); *B29C 70/14* (2013.01);
(Continued)

(58) Field of Classification Search
CPC .............. C08J 5/24; B29K 2101/10; B29K 2105/0872; B29K 2105/14;
(Continued)

(56) References Cited

U.S. PATENT DOCUMENTS 4,770,929 A  *  9/1988  Nobumasa .............. B32B 27/18
                                                          442/278
5,637,375 A     6/1997  Hohman
(Continued)

FOREIGN PATENT DOCUMENTS

JP    S46-005486 A    11/1971
JP    H09-038968 A     2/1997
(Continued)

OTHER PUBLICATIONS

Europe Patent Office, "Search Report for European Patent Application No. 19803166.8," dated Oct. 19, 2020.
(Continued)

*Primary Examiner* — Camie S Thompson
(74) *Attorney, Agent, or Firm* — Manabu Kanesaka; Benjamin Hauptman; Kenneth Berner

(57) ABSTRACT

An object is to provide a composite material manufacturing method for improving interlayer strength. The present disclosure provides a composite material manufacturing method of laminating a plurality of prepregs (10) formed of a fiber reinforced base material impregnated with an uncured matrix resin and performing hot molding, the method including: using the prepregs (10) each provided with a gap layer (12) that does not contain a resin and is continuous in an in-plane direction and resin layers (11a, 11b) disposed on both surfaces of the gap layer; disposing a plurality of short fibers (13) on facing surfaces of the prepregs (10) that are
(Continued)

adjacent to each other; and evacuating the laminated prepregs (10) to degas the gap layer (12) and then performing hot molding.

6 Claims, 3 Drawing Sheets

(51) Int. Cl.
*B29C 70/14* (2006.01)
*B29C 70/16* (2006.01)
*B29C 70/54* (2006.01)
*B32B 5/26* (2006.01)
*B32B 37/00* (2006.01)
*B32B 37/18* (2006.01)
*B29K 101/10* (2006.01)
*B29K 105/08* (2006.01)
*B29K 105/14* (2006.01)

(52) U.S. Cl.
CPC ............ *B29C 70/16* (2013.01); *B29C 70/543* (2013.01); *B32B 5/26* (2013.01); *B32B 37/003* (2013.01); *B32B 37/182* (2013.01); *B29K 2101/10* (2013.01); *B29K 2105/0872* (2013.01); *B29K 2105/14* (2013.01); *B32B 2305/076* (2013.01); *B32B 2305/08* (2013.01); *B32B 2305/10* (2013.01); *B32B 2305/22* (2013.01); *B32B 2398/10* (2013.01)

(58) Field of Classification Search
CPC .......... B32B 2305/076; B32B 2305/08; B32B 2305/10; B32B 2305/22; B32B 2398/10; B32B 37/003; B32B 37/182; B32B 5/00; B32B 5/26; B29C 70/081; B29C 70/12; B29C 70/14; B29C 70/543; B29C 70/44; B29C 70/443; B29C 43/56; B29C 43/34
USPC ............... 442/278, 281; 428/367, 408, 301.4
See application file for complete search history.

(56) References Cited

U.S. PATENT DOCUMENTS

| | | | |
|---|---|---|---|
| 5,641,366 A | 6/1997 | Hohman | |
| 5,871,604 A | 2/1999 | Hohman | |
| 2014/0322504 A1* | 10/2014 | Narimatsu | ............... B32B 5/022 428/212 |
| 2015/0376353 A1 | 12/2015 | Takebe et al. | |

FOREIGN PATENT DOCUMENTS

| | | |
|---|---|---|
| JP | 2003-080607 A | 3/2003 |
| JP | 2004-106347 A | 4/2004 |
| JP | 2004-182923 A | 7/2004 |
| JP | 2004-238615 A | 8/2004 |
| JP | 2010-229238 A | 10/2010 |
| JP | 2014-015567 A | 1/2014 |
| JP | 2017-065181 A | 4/2017 |
| JP | 2017-159652 A | 9/2017 |
| WO | 2014/103658 A1 | 7/2014 |

OTHER PUBLICATIONS

PCT/ISA/210, "International Search Report for International Application No. PCT/JP2019/017623," dated Jul. 30, 2019.
Japan Patent Office, "Office Action for Japanese Patent Application No. 2018-096233," dated Jun. 23, 2020.

* cited by examiner

COMPOSITE MATERIAL MANUFACTURING METHOD AND COMPOSITE MATERIAL

RELATED APPLICATIONS

The present application is National Phase of International Application No. PCT/JP2019/017623 filed Apr. 25, 2019, and claims priority from Japanese Application No. 2018-096233, filed May 18, 2018, the disclosure of which is hereby incorporated by reference herein in its entirety.

TECHNICAL FIELD

The present disclosure relates to a composite material manufacturing method and a composite material.

BACKGROUND ART

In the fields of air crafts, ships, wheeled vehicles, and the like, composite materials made of fiber reinforced plastics (FRP) have widely been used as structures (PTL 1). The composite materials have an advantage that the materials are "lighter and stronger" than metal. FRP is a material configured of reinforced fibers and a matrix resin.

As composite material manufacturing methods using FRP, a method of disposing dry reinforced fibers in a mold, pouring a matrix resin thereto, causing the reinforced fibers to be impregnated with the matrix resin, and perform molding and a method of laminating prepregs and perform molding are known.

According to PTL 1, a composite material is manufactured by the former method using a laminated body obtained by laminating a plurality of reinforced clothes formed by reinforced fiber yarn.

The "prepregs" used in the latter method are sheet-shaped intermediate materials obtained by causing reinforced fibers to be impregnated with an uncured resin and stopping a curing reaction of the resin for ease of handling. A method of laminating the prepregs in an arbitrary direction and performing curing and molding under a pressure in an autoclave is considered to be a most reliable means for achieving high quality.

For strength design of structural components using the composite materials, stationary strength evaluation and quasi-static strength evaluation are performed for each load input state. One of important evaluation criteria for the quasi-static strength evaluation is fracture toughness (hereinafter, abbreviated as toughness). In the latter case, the toughness is evaluated using a test piece obtained by attaching the fiber reinforced prepregs directed in an arbitrary direction thereto in an arbitrary direction and curing the fiber reinforced prepregs.

CITATION LIST

Patent Literature

[PTL 1]
Japanese Unexamined Patent Application, Publication No. 2003-80607

SUMMARY OF INVENTION

Technical Problem

As described above, the composite materials include laminated fiber reinforced layers (reinforced clothes or prepregs). Molded articles of the laminated fiber reinforced layers have low toughness between the fiber reinforced layer and the fiber reinforced layer (between the layers). Therefore, the molded articles frequently break due to cracking between the layers. An advancing direction of the cracking is an in-plane direction S of the fiber reinforced layers in many cases.

As methods for enhancing toughness between the layers, (1) to (3) below can be listed.

(1) Elastomer particles are dispersed in a resin itself.
(2) A thermoplastic resin is introduced between the layers.
(3) A three-dimensional woven product in which fibers are orientated in a plate thickness direction is applied.

FIG. 3 is a schematic sectional view in a thickness direction of a composite material 20 in which elastomer particles (rubber particles) 21 are dispersed in a matrix resin. In the composite material 20 in which a soft material such as elastomer particles 21 is dispersed, the elastomer particles 21 pop when a load is applied thereto, and thus generated gaps lead to a room in which the resin can be deformed. In this manner, the composite material 20 in FIG. 3 can absorb fracture energy through shear deformation. On the other hand, in the case in which the elastomer particles 21 are dispersed, it is necessary to manage granularity and a dispersed state of the elastomer particles 21 and to perform a process of adding a toughness improver later, and this leads to an increase in costs. Further, if the elastomer particles 21 are added to the matrix resin, the amount of matrix resin becomes relatively small, and strength of the composite material is thus degraded.

FIG. 4 is a schematic sectional view in a thickness direction of a composite material 30 in which a thermoplastic resin 32 is introduced between a fiber reinforced layer 31 and a fiber reinforced layer 31. The thermoplastic resin 32 inserted has highly stretchable and thermally stable characteristics. The thermoplastic resin 32 between the layers contributes to an improvement in toughness of the composite material. The thermoplastic resin 32 has a higher effect of improving toughness than the elastomer particles 21 in FIG. 3 do. On the other hand, in the case in which the thermoplastic resin 32 is introduced, it is necessary to manage granularity and a dispersed state of the thermoplastic resin 32, and this leads to an increase in costs. Further, there are problems such as a problem that a temperature raising speed and the like are strictly restricted due to thermal stable states of the thermoplastic resin 32 and the matrix resin.

FIG. 5 is a schematic sectional view in a thickness direction of a composite material 40 that is a three-dimensional woven product in which reinforced fibers are oriented in a thickness direction T. Since the reinforced fibers are oriented in the thickness direction, a high interlayer toughness reinforcing effect is achieved. On the other hand, since manufacturing costs of the three-dimensional woven product are higher than those of woven products in the related art, and a fiber orientation in the in-plane direction S decreases, strength of the composite material 40 is degraded. In the three-dimensional woven product, the fibers orientated in the thickness direction are disposed so as to avoid bundles of fibers oriented in the in-plane direction S. Meandering and deviation of the bundles of fibers generated at this time may be factors of a decrease in strength of the composite material 40. Further, a method of forming a fiber reinforced layers into a desired shape and then impregnating the fiber reinforced layer with a resin is typically employed for the three-dimensional woven product, and it is difficult to employ a method using prepregs.

The present disclosure has been made in view of such circumstances, and an object thereof is to provide a composite material manufacturing method for improving interlayer strength. An object of the present disclosure is to provide a less expensive composite material with improved interlayer strength.

Solution to Problem

In order to solve the aforementioned problems, a composite material manufacturing method and a composite material according to the present disclosure employ the following means.

According to the present disclosure, there is provided a composite material manufacturing method of laminating a plurality of prepregs formed of a fiber reinforced base material impregnated with an uncured matrix resin and performing hot molding, the method including: using the prepregs each provided with a gap layer that does not contain a matrix resin and is continuous in an in-plane direction and resin layers disposed on both surfaces of the gap layer; disposing a plurality of short fibers on facing surfaces of the prepregs that are adjacent to each other; and evacuating the laminated prepregs to degas the gap layer and then performing hot molding.

According to the present disclosure, there is provided a composite material including: a laminated body obtained by laminating a plurality of fiber reinforced base materials; a cured matrix resin with which the laminated body is filled; and a plurality of short fibers that are directed in directions different from an in-plane direction of the fiber reinforced base materials and are present between the fiber reinforced base materials adjacent to each other.

According to the aforementioned disclosure, the short fibers disposed between the prepregs come into contact with the matrix resin. The orientation of the short fibers changes with the matrix resin, which has been heated and has been able to flow, flowing into the gap layers, and the short fibers are directed in directions different from the in-plane direction of the fiber reinforced base materials. In this manner, the short fibers bridge the adjacent fiber reinforced base materials. The short fibers that are present so as to bridge between the adjacent fiber reinforced base materials reinforce bonding between the adjacent fiber reinforced base materials (between layers). According to the aforementioned invention, an interlayer reinforcing effect that is similar to an interlayer reinforcing effect of a three-dimensional woven product can be obtained.

The prepregs each including the resin layers provided on both the surfaces of the gap layer have more satisfactory properties of positioning the prepregs at the time of lamination than prepregs each including a resin layer provided only on one surface does.

According to an aspect of the aforementioned present disclosure, the plurality of prepregs are preferably laminated such that surfaces on a same side are directed in a same direction. In this manner, it is possible to allow similar toughness for a plurality of interlayer portions.

According to an aspect of the aforementioned present disclosure, in a case in which thicknesses of the resin layers disposed on both the surfaces of the gap layer are different from each other, the plurality of prepregs are preferably laminated such that a thinner resin layer is directed upward in a lamination direction. In this manner, the orientation of the short fibers is likely to be directed in a thickness direction of the prepregs.

According to an aspect of the aforementioned present disclosure, the matrix resin contained in the resin layers may preferably include a thermosetting resin or a thermosetting resin and a curing agent.

The term "include" described here allows for not only a meaning of "include only" but also a meaning of "include additives except for a thermoplastic resin, an elastomer and a toughness improver". Examples of the "toughness improver" include rubbers, the representative examples of which include nitrile rubber, thermoplastic resins that are compatible with a matrix resin (for example, polyether sulfone in a case in which the matrix resin is an epoxy resin), resins that are highly compatible with a long-chain matrix resin with an increased distances between crosslinking points or a matrix resin, benzoxazine resins with an increased shear deformation capability in which hydrogen bonds are present in the layer form and the like. Examples of the "additives" include an ultraviolet absorber, a flame retardant, a thickener and a viscosity adjusting agent, an internal mold releasing agent, a lubricant, and the like.

A thermosetting resin that does not contain a thermoplastic resin, an elastomer, and a toughness improver is less expensive than a thermosetting resin that contains a thermoplastic resin, an elastomer, and a toughness improver. Since the thermoplastic resin that does not contain a toughness improver has a high crosslinking density, a curing temperature approaches a glass transition temperature. Since a curing reaction of the thermosetting resin that does not contain a thermoplastic resin, an elastomer, and a toughness improver is simple in accordance with non-presence of extra additives, it is easy to manage a temperature and the like when a prepreg provided with a gap layer is manufactured and when a composite material is manufactured. In this manner, it is possible to select a matrix resin and a reinforced fiber on the user side in accordance with an application.

According to an aspect of the aforementioned present disclosure, the short fibers have a length that is equal to or greater than a thickness of the gap layer. In this manner, even in a case in which the matrix resin moves by the amount corresponding to the thickness of the gap layer, the short fibers can be present between the adjacent fiber reinforced base materials as long as the short fibers are oriented in the thickness direction of the prepregs.

Advantageous Effects of Invention

According to the present disclosure, it is possible to manufacture a composite material capable of obtaining a toughness improving effect that is similar to a toughness improving effect of a three-dimensional woven product at low costs without using expensive prepregs of a toughness improving type.

DESCRIPTION OF EMBODIMENTS

A composite material manufacturing method according to the present disclosure can be applied to structural components for aircrafts made of carbon fiber reinforced plastic (CFRP). Specifically, the composite material manufacturing method according to the present disclosure is suitably applied to primary structural members for aircrafts that require residual strength after application of impact. Further, the composite material manufacturing method according to the present disclosure can also be applied to secondary structural members (fairings, nacelle covers, and the like) for aircrafts that have lower requirements for impact resistance as compared with the primary structural members while requiring easy fabrication at low costs and further weight reduction. Further, the composite material manufacturing method according to the present disclosure can also be applied to components (for example, forklifts and platform doors placed at train station platforms) for general industrial machines that require impact properties.

Figure 1:
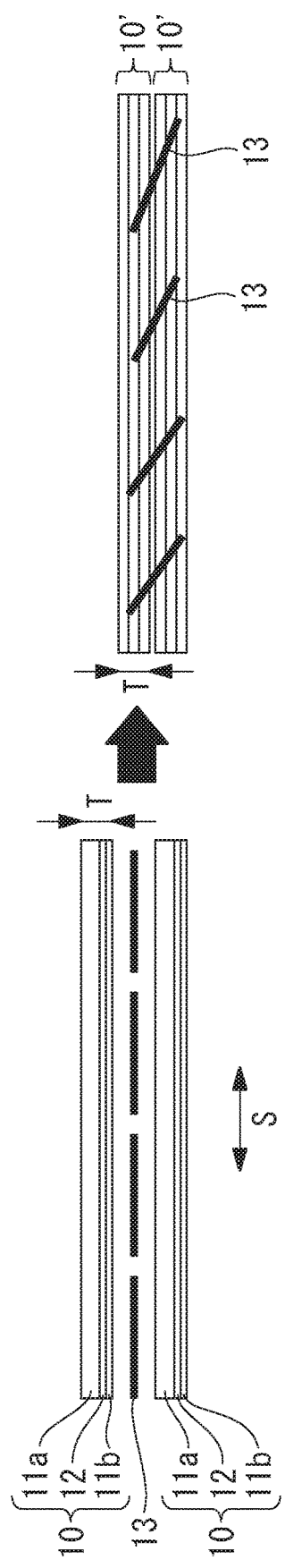
FIG. 1 is a diagram for explaining a composite material manufacturing method according to an embodiment.

First, the composite material manufacturing method according to an embodiment will be described with reference to FIG. 1. In the embodiment, a plurality of prepregs 10 formed of a fiber reinforced base material impregnated with an uncured matrix resin are laminated, and hot molded, thereby manufacturing a composite material. Note that although a method of laminating two prepregs will be exemplified in FIG. 1, the number of prepregs laminated is not limited thereto.

(Prepreg Lamination)

As the prepregs 10, semi-impregnated prepregs each including a gap layer 12 between resin layers (11a, 11b) are used. The semi-impregnated prepregs will be described later in detail. When the prepregs 10 are laminated, a plurality of short fibers 13 are disposed between facing surfaces of the adjacent prepregs 10. After the lamination, the plurality of short fibers 13 are brought into a state in which the short fibers 13 come into contact with matrix resins in the prepregs 10.

The short fibers are, for example, nanocellulose fibers, and the thickness ranges from 10 microns to 100 microns. The short fibers are, for example, a short fiber mat material of acrylic fibers, nylon fibers, glass fibers, or the like, and ranges 10 g/m$^2$ to 100 g/m$^2$ per unit area weight.

For example, the short fibers 13 are randomly sprinkled on the surface of one prepregs 10, and the next prepreg 10 is then laminated on the one prepreg 10 so as to sandwich the short fibers 13 therebetween. In a case in which two or more prepregs 10 are laminated, disposition of the short fibers 13 and lamination of the prepregs 10 may be repeated a predetermined number of times in accordance with the above description.

Each prepreg 10 has a front-side surface provided with the resin layer 11a and a rear-side surface provided with the resin layer 11b. The plurality of prepregs 10 may be laminated such that all the surfaces on the same side are directed on the same side. In a case in which the thicknesses of the resin layers (11a, 11b) disposed on both surfaces of the gap layer 12 are different from each other (in a case in which the gap layer 12 is unevenly located toward any one side of each prepreg 10 in a thickness direction T of the prepreg), in particular, it is desirable to laminate the plurality of prepregs 10 such that the thinner resin layers 11b are directed upward in a lamination direction. However, only in the case in which the number of prepregs 10 laminated is two, the prepregs 10 are laminated such that the thinner resin layers 11b face each other. The sentence "the thicknesses are different from each other" indicates a case in which there is a difference of equal to or greater than 100 μm when the thicknesses of the resin are compared.

In the embodiment, the "thickness direction T" of the prepregs is a direction that substantially perpendicularly intersects with the surfaces of the prepregs and approximately corresponds to the direction that is the same as the lamination direction of the prepregs.

(Hot Molding)

A laminated body in which the plurality of prepregs 10 are laminated is wrapped with a bagging film (not illustrated), the inside thereof is vacuumed, the gap layers 12 are sufficiently degassed, and hot molding is then performed.

The degassing is performed with a vacuum level of equal to or less than 200 mmHg or preferably equal to or less than 150 mmHg. In order to prevent gas after degassing from returning to the laminated body, it is preferable to constantly perform the vacuuming during the molding. The term "sufficiently" means 10 minutes or more. The gap layers 12 themselves act as degassing circuits. In a case in which the degassing is insufficiently performed, the degassing circuits may be blocked, which is unfavorable.

Heating is started after the gap layers 12 are sufficiently degassed. A heating means to be used includes an oven or a heater mat and the like as well as an autoclave. The heating is performed in at least three stages, namely first heating for raising the temperature from an ordinary temperature to a predetermined temperature, second heating for raising the temperature from the predetermined temperature to a molding temperature, and third heating for holding the molding temperature for a predetermined period of time to cure the matrix resin.

The temperature raising speed in the first heating is preferably equal to or less than 10° C./min. The temperature raising speed in the second heating is preferably equal to or less than 10° C./min. The predetermined temperature is equal to or greater than 100° C. The molding temperature is a temperature at which the matrix resin can be cured. Since the prepregs used in the embodiment do not contain additives such as a thermoplastic resin and an elastomer, the aforementioned molding temperature and the aforementioned predetermined period of time may simply be determined in accordance with properties of the matrix resin. The molding temperature and the predetermined period of time may be set according to the conditions that are recommended by a manufacturer of the matrix resin used.

If the temperature of the matrix resin is raised to the predetermined temperature, the viscosity of the matrix resin once decreases, and the matrix resin can flow. The matrix resin with a decreased viscosity flows into the gap layers 12 and fills the gaps of the fiber reinforced base materials. The short fibers 13 that have come into contact with the matrix resin are drawn into nearby fiber reinforced base materials in accordance with the flow of the matrix resin. Since the matrix resin flows in the thickness direction, the short fibers 13 are also oriented in directions (mainly in the thickness direction T of prepregs 10') that are different from the in-plane direction S of the prepregs 10'.

The prepregs 10 may be pressurized (with 2 to 3 atm., for example) at a timing at which the viscosity of the matrix resin starts to decrease. In the case in which the pressurization is performed, the heating temperature is adjusted such that the temperature raising speed in the second heating does not exceed a desired range. It is possible to promote the flowing of the matrix resin into the gap layers 12 through the pressurization.

According to the method in the aforementioned embodiment, it is possible to obtain the composite material including the laminated body in which the plurality of fiber reinforced base materials are laminated, the cured matrix resin with which the laminated body is filled, and the plurality of short fibers 13 that are directed in directions different from the in-plane direction of the fiber reinforced base materials and are present between the plurality of fiber reinforced base materials.

The short fibers 13 oriented in directions different from the in-plane direction S of the fiber reinforced base materials can be present between the plurality of fiber reinforced base materials. According to such a composite material, bonding between the fiber reinforced base materials (between the layers) is enhanced, and toughness is improved.

Next, materials used in the manufacturing method according to the embodiment will be described in further detail.

(Fiber Reinforced Base Material)

The fiber reinforced base material is a monodirectional material in which bundles of fibers are arranged in one direction (longitudinal direction), a non-woven cloth, a woven cloth, or the like. The fibers used in the fiber reinforced base material is carbon fibers, glass fibers, organic fibers, inorganic fibers other than glass, or the like. The thickness of the fiber reinforced base material is preferably equal to or greater than 0.05 mm and equal to or less than 0.5 mm.

(Matrix Resin)

A highly heat-resistant thermosetting resin is used as the matrix resin. The highly heat-resistant thermosetting resin can be selected from resin materials that are generally used for mold materials or for jigs. Specifically, the thermosetting resin is an epoxy resin, a polyester resin, a vinyl ester resin, a cyanate ester resin, a polyimide resin, or the like. "Highly heat-resistant" can be defined in accordance with an application of the composite material. For example, "highly heat-resistant" means that the resin is durable against a heat that is equal to or greater than 150° C. in a case of a structural member for an aircraft.

In a case in which two-solution mixed-type thermosetting resin is used, the matrix resin may contain the thermosetting resin and a curing agent. The matrix resin does not contain a thermoplastic resin, an elastomer, a long-chain resin, and the like. The matrix resin may contain additives such as an internal mold releasing agent, a flame retardant, an ultraviolet absorber, and a lubricant. The proportion of the additives added is less than 20% by weight, is preferably less than 10% by weight, and is further preferably 0% by weight with respect to the total amount of matrix resin.

If a highly heat-resistant hard resin is employed, the gap layers 12 are likely to remain when the prepregs are manufactured. The gap layers 12 are unlikely to be crushed even when the prepregs are stored and when an operation of molding the composite material is performed by employing the highly heat-resistant resin. The highly heat-resistant thermosetting resin that does not contain a thermoplastic resin and an elastomer is less expensive as compared with a toughness improving-type resin in which an elastomer and a thermoplastic resin are mixed.

(Prepreg)

Figure 2:
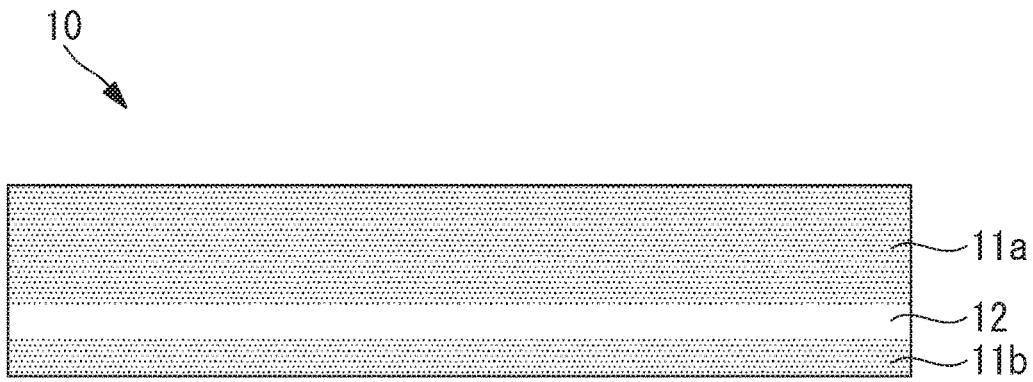
FIG. 2 is a sectional view in a thickness direction of a prepreg used in the embodiment.
Figure 3:
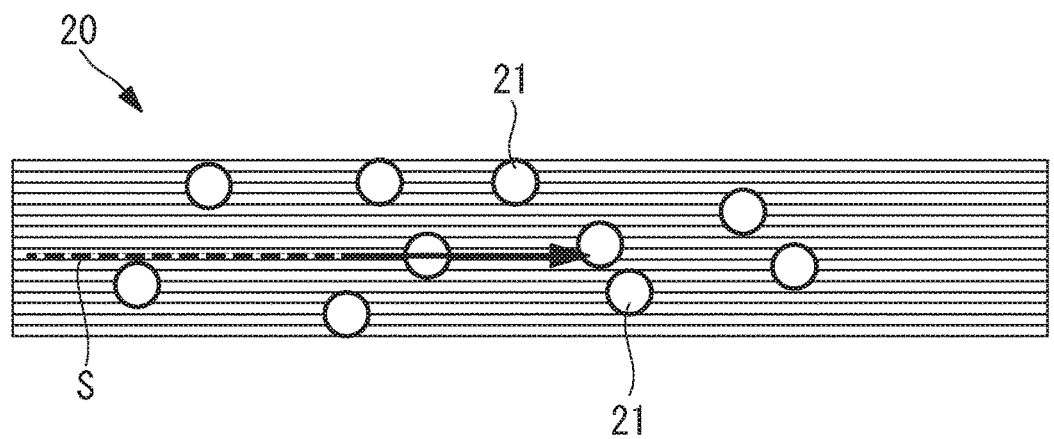
FIG. 3 is a schematic sectional view in a thickness direction of a composite material in the related art.
Figure 4:
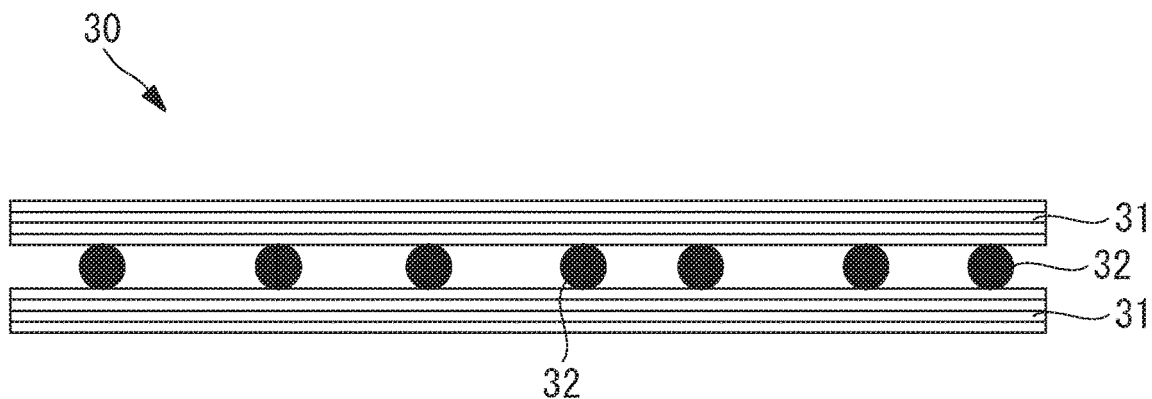
FIG. 4 is a schematic sectional view in a thickness direction of a composite material in the related art.
Figure 5:
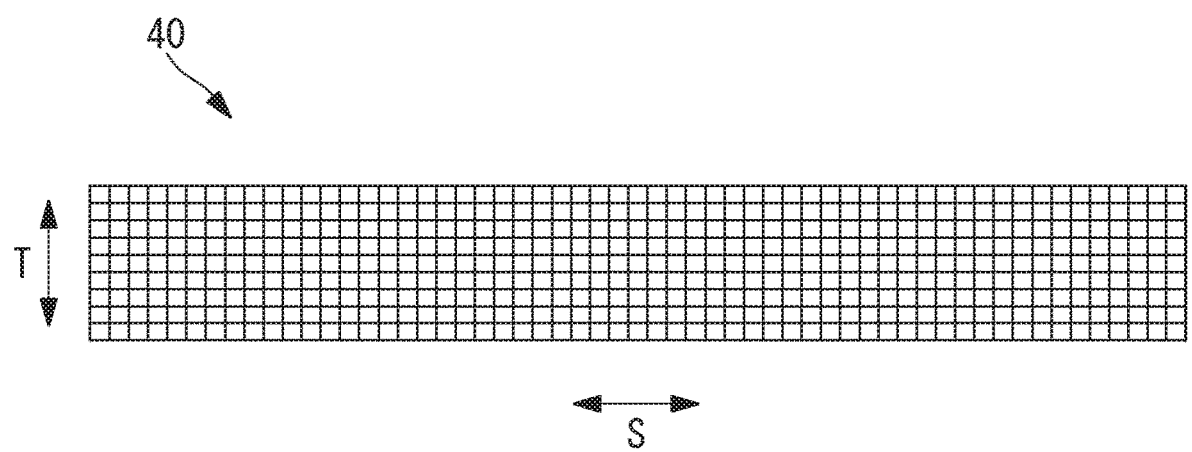
FIG. 5 is a schematic sectional view in a thickness direction of a composite material in the related art.

The prepreg is an intermediate material formed of a fiber reinforced base material impregnated with an uncured matrix resin. FIG. 2 exemplifies a sectional view in the thickness direction of the prepreg used in the embodiment. The prepreg 10 used in the embodiment is a semi-impregnated prepreg.

The semi-impregnated prepreg includes the gap layer 12 and the resin layers (11a, 11b) disposed on both the surfaces of the gap layer 12.

The gap layer 12 is a layer configured of a fiber reinforced base material (not illustrated) that does not contain the matrix resin. The gap layer 12 is continuous in the in-plane direction S. The thickness of the gap layer 12 is preferably 0.1 mm to a half of the thickness of one layer. The thickness of the gap layer 12 in FIG. 2 is 0.1 mm.

The resin layers (11a, 11b) cover both the surfaces of the fiber reinforced base material (gap layer 12). The resin layers (11a, 11b) are layers configured of the fiber reinforced base material and the matrix resin with which the fiber reinforced base material is impregnated. The thickness of the resin layer 11a in FIG. 2 is equal to or greater than the thickness of the gap layer.

The semi-impregnated prepreg can be manufactured by attaching films of the matrix resin produced in advance to both the surfaces of the fiber reinforced base material, performing vacuuming, applying a heat, causing the fiber reinforced base material to be impregnated with the matrix resin, and stopping a reaction near a gelation point of the matrix resin before the entire fiber reinforced base material is impregnated with the matrix resin.

By adjusting a temperature, a force for the vacuuming, and a pressure, it is possible to leave a gap (a region that has not been impregnated with the matrix resin) in the thickness direction of the fiber reinforced base material.

In the semi-impregnated prepreg manufactured by the aforementioned method, the gap layer 12 may be unevenly formed toward the vertically lower surface side of the fiber reinforced base material as shown in FIG. 2. When the prepreg is manufactured, such unevenness is caused as a result of fixing fiber positions when the fibers are arranged in one direction and impregnating only one surface with the resin earlier, which leads to deep impregnation of the one surface with the resin.

It is possible to cause a curing reaction to simply depend on characteristics of the thermosetting resin by not containing extra additives such as a thermoplastic resin and an elastomer in the matrix resin. This makes it easier to manage the curing reaction, and it is thus possible to form the gap layer 12 with a desired thickness.

(Short Fibers)

The short fibers 13 may be any fiber as long as the short fibers 13 have a soft texture and are easily drawn into the flow of the matrix resin. Specifically, the short fibers 13 are polyamide fibers (nylon, for example), cellulose fibers, glass fibers, polyester fibers, or the like.

The short fibers 13 have a length that is equal to or greater than the thickness of the gap layer. Specifically, the length of the short fibers 13 is equal to or greater than 0.1 mm.

If the short fibers 13 are excessively thick, the short fibers 13 are unlikely to be drawn into the fiber reinforced base material. If the short fibers 13 are excessively thin, handling properties are degraded. If the short fibers 13 are excessively thin, a reinforcing effect is lowered. At an ordinary temperature, the surface of the prepreg is sticky to some extent. Therefore, the short fibers 13 that satisfy the aforementioned diameter range can be held on the surface of the prepreg due to the stickiness only by being sprinkled on the surface of the prepreg.

REFERENCE SIGNS LIST

10 Prepreg (with a gap layer)
10' Prepreg (a gap layer has already been impregnated with a matrix resin)
11a, 11b Resin layer
12 Gap layer
13 Short fiber
20, 30, 40 Composite material 21 Elastomer particle
31 Fiber reinforced layer
32 Thermoplastic resin

The invention claimed is:

1. A composite material manufacturing method of laminating a plurality of prepregs formed of a fiber reinforced base material impregnated with an uncured matrix resin and performing hot molding, the method comprising:
    using the prepregs each provided with a gap layer that does not contain a resin and is continuous in an in-plane direction and resin layers disposed on both surfaces of the gap layer;
    disposing a plurality of short fibers on facing surfaces of the prepregs that are adjacent to each other; and
    evacuating the laminated prepregs to degas the gap layer and then performing hot molding.

2. The composite material manufacturing method according to claim 1, wherein the plurality of prepregs are laminated such that surfaces on a same side are directed in a same direction.

3. The composite material manufacturing method according to claim 1, wherein in a case in which thicknesses of the resin layers disposed on both the surfaces of the gap layer are different from each other, the plurality of prepregs are laminated such that a thinner resin layer is directed upward in a lamination direction.

4. The composite material manufacturing method according to claim 1, wherein the matrix resin contained in the resin layers includes a thermosetting resin or a thermosetting resin and a curing agent.

5. The composite material manufacturing method according to claim 1, wherein the short fibers have a length that is equal to or greater than a thickness of the gap layer.

6. The composite material manufacturing method according to claim 1, further comprising a step of, during the hot molding, drawing the plurality of short fibers into the fiber reinforced base materials of the prepregs that are adjacent to each other in accordance with the flow of the matrix resin.

* * * * *